United States Patent
Kreuzer

(10) Patent No.: US 9,304,958 B2
(45) Date of Patent: Apr. 5, 2016

(54) DEVICE FOR TRANSMITTING SENSOR DATA

(71) Applicant: DR. JOHANNES HEIDENHAIN GMBH, Traunreut (DE)

(72) Inventor: Stephan Kreuzer, Surberg-Ettendorf (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 280 days.

(21) Appl. No.: 13/749,385

(22) Filed: Jan. 24, 2013

(65) Prior Publication Data

US 2013/0198428 A1      Aug. 1, 2013

(30) Foreign Application Priority Data

Jan. 27, 2012   (DE) .......................... 10 2012 201 170

(51) Int. Cl.
G06F 13/00      (2006.01)
G06F 13/36      (2006.01)
H04Q 9/00       (2006.01)

(52) U.S. Cl.
CPC .................. *G06F 13/36* (2013.01); *H04Q 9/00* (2013.01); *H04Q 2209/845* (2013.01)

(58) Field of Classification Search
USPC .......................................... 710/306, 315, 316
See application file for complete search history.

(56) References Cited

U.S. PATENT DOCUMENTS

| | | | |
|---|---|---|---|
| 5,687,103 A | 11/1997 | Hagl et al. | |
| 6,170,470 B1* | 1/2001 | Clarkson | F02D 33/003 123/25 C |
| 7,486,182 B2 | 2/2009 | Hahn et al. | |
| 2002/0049506 A1* | 4/2002 | Birk et al. | 700/69 |
| 2004/0117755 A1* | 6/2004 | Blodget et al. | 716/17 |
| 2006/0004545 A1* | 1/2006 | Souda | 702/188 |
| 2008/0162005 A1* | 7/2008 | Tang | B66C 13/40 701/50 |
| 2010/0019135 A1 | 1/2010 | Eckert et al. | |
| 2010/0185418 A1* | 7/2010 | Fukumura | H04L 12/40013 702/188 |
| 2010/0332179 A1* | 12/2010 | Kurtz et al. | 702/138 |
| 2012/0098446 A1* | 4/2012 | Kim et al. | 315/193 |
| 2013/0169261 A1* | 7/2013 | Fendt | G01R 31/041 323/318 |

FOREIGN PATENT DOCUMENTS

| | | |
|---|---|---|
| DE | 103 06 231 | 8/2004 |
| DE | 10 2006 041 056 | 3/2008 |
| EP | 0 171 579 | 2/1986 |
| EP | 0 660 209 | 6/1995 |

* cited by examiner

*Primary Examiner* — Faisal M Zaman
(74) *Attorney, Agent, or Firm* — Kenyon & Kenyon LLP

(57) ABSTRACT

A device for transmitting sensor data, includes a slave interface connectable to a master interface of a control device, a master interface connectable to a slave interface of a measuring device, at least one sensor interface connectable to a sensor, and a circuit configuration including a manipulation unit and protocol unit. A master-data input signal of the master interface and a sensor-data output signal are supplied to the manipulation unit, which outputs a slave-data output signal to the slave interface. At least one protocol-relevant interface signal of the slave interface or the master interface, and a sensor-data signal of the sensor interface, are supplied to the protocol unit, which generates the sensor-data output signal and, based on manipulation rules and the at least one protocol-relevant interface signal, selects when the manipulation unit outputs the master-data input signal of the master interface or the sensor-data output signal as slave-data output signal.

8 Claims, 3 Drawing Sheets

DEVICE FOR TRANSMITTING SENSOR DATA

CROSS-REFERENCE TO RELATED APPLICATIONS

The present application claims priority to Application No. 10 2012 201 170.6, filed in the Federal Republic of Germany on Jan. 27, 2012, which is expressly incorporated herein in its entirety by reference thereto.

FIELD OF THE INVENTION

The present invention relates to a device for transmitting sensor data. In particular, using an interface connection between a measuring device and a control device, measured values of a sensor may be transmitted to the control device with the aid of a device as described herein.

BACKGROUND INFORMATION

Measuring devices which make digital measured values available are being used increasingly in automation technology. In the field of numerical controls, which are used for controlling machine tools, for example, this is true especially for position-measuring devices for measuring linear or rotary movements. Position-measuring devices which generate digital measured values are referred to as absolute position-measuring devices.

Primarily serial data interfaces are used for transmitting absolute position values, since they make do with only a few data-transmission lines, and nevertheless, have high data-transmission rates. Particularly advantageous are so-called synchronous serial interfaces, which have one unidirectional or bidirectional data line and one clock line. Data packets are transmitted via the data line synchronized with a clock signal on the clock line. A multitude of standard digital interfaces have gained acceptance in automation technology. Among popular representatives for synchronous serial interfaces are the EnDat interface of Dr. Johannes Heidenhain GmbH, and the SSI interface. In addition, asynchronous serial interfaces such as Hiperface are also prevalent.

The SSI interface is described, for example, in European Published Patent Application No. 0 171 579. It is a synchronous serial data interface having one unidirectional data line and one unidirectional clock line. Position values are read out from a position-measuring device synchronized with a clock signal on the clock line.

On the other hand, European Patent No. 0 660 209 describes the fundamentals of the EnDat interface. It is likewise a synchronous serial interface which, however, besides the unidirectional clock line, has a bidirectional data line. It is thereby possible to transmit data in both directions—from the numerical control to the position-measuring device and from the position-measuring device to the numerical control. The data is transmitted in synchronization with a clock signal on the clock line, as well.

Moreover, in addition to the data which is acquired or calculated in the measuring device, there is often the desire to also transmit data, which is generated by external devices or sensors, via the existing interface connection, e.g., between a position-measuring device and a numerical control.

For example, German Patent No. 10 2006 041 056 describes providing a rotary encoder with additional interfaces to which external sensors may be connected, the sensor data being able to be processed in the encoder and transmitted via a bus interface to a control.

German Published Patent Application No. 103 06 231 describes an intermediate assembly, to which, on one hand, peripheral equipment, e.g., sensors, may be connected, and which, on the other hand, may be connected by a communication interface to a position-measuring device. The position-measuring device may, in turn, process the sensor data and/or output it via an interface connection in the direction of a numerical control.

Both variants require at least one additional interface on the rotary encoder, which moreover, must also be accessible in the incorporated state.

SUMMARY

Example embodiments of the present invention provide for the possibility of transmitting sensor signals to a control device via an interface connection between a measuring device and the control device, without modifying the measuring device.

According to an example embodiment of the present invention, a device for transmitting sensor data includes: a first slave interface connectable to a master interface of a control device; a first master interface connectable to a slave interface of a measuring device; at least one sensor interface connectable to a sensor; and a circuit configuration including a manipulation unit and a protocol unit. The manipulation unit is adapted to receive a master-data input signal of the first master interface and a sensor-data output signal and to output a slave-data output signal to the first slave interface, and the protocol unit is adapted to receive (a) at least one protocol-relevant interface signal of the first slave interface or of the first master interface and (b) a sensor-data signal of the sensor interface. The protocol unit is adapted to generate the sensor-data output signal from the sensor-data signal, and the protocol unit is adapted to select, based on manipulation rules and the at least one protocol-relevant interface signal, when the manipulation unit outputs the master-data input signal of the first master interface or the sensor-data output signal as the slave-data output signal.

The sensor may include a digital sensor.

The sensor may include an analog sensor, and the device may further include a sensor-data processing unit adapted to generate the sensor-data signal from a sensor signal of the analog sensor.

To rectify inconsistencies in the slave-data output signal caused by an output of the sensor-data output signal, the protocol unit may be adapted to generate a correction-data signal, the manipulation unit may be adapted to receive the correction-data signal, and the manipulation unit may be adapted to output the correction-data signal as the salve-data output signal as a function of the protocol-relevant interface signal.

The device may include an operator interface connectable to an operator-control unit, and the operator interface may be adapted to program and/or operate the circuit configuration.

The circuit configuration may include a manipulation memory adapted to store manipulation rules.

The device may further include an operator interface connectable to an operator-control unit, the operator interface may be adapted to program and/or operate the circuit configuration, and the manipulation memory may be writable via the operator interface.

According to an example embodiment of the present invention, a system includes: a control device including a master interface; a measuring device including a first slave interface; a sensor; and a device for transmitting sensor data as described above.

Further features and aspects of example embodiments of the present invention are described in more detail below with reference to the appended Figures.

DETAILED DESCRIPTION

Figure 1:
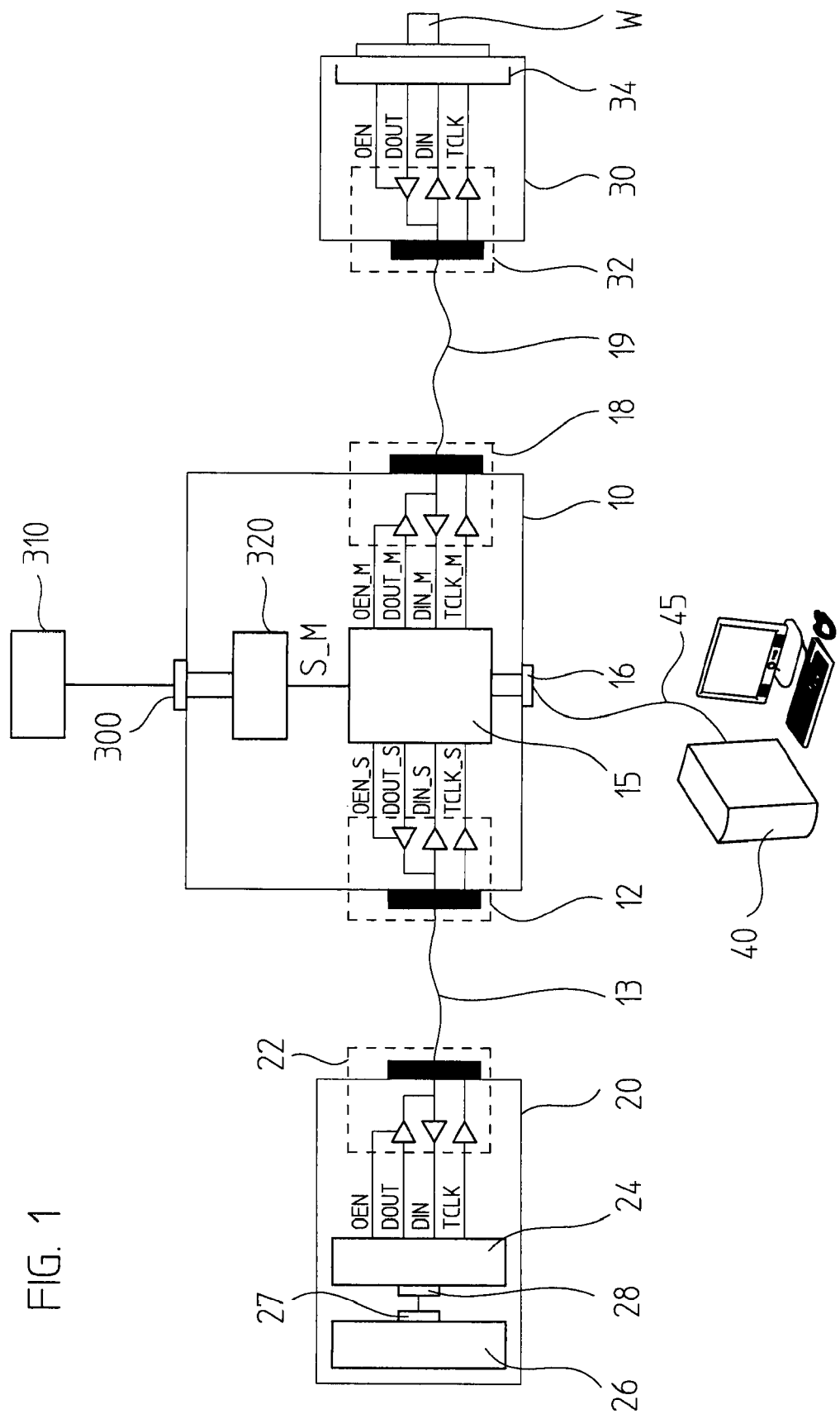
FIG. 1 illustrates a device according to an example embodiment of the present invention disposed between a control device and a position-measuring device.

FIG. 1 illustrates a device 10, for manipulating interface signals, arranged between a control device 20 and a measuring device 30. Control device 20 may be any device of automation engineering or drive engineering that has at least one serial interface capable of communicating with a measuring device connected to the interface. Examples include position displays, numerical controls (NCs), programmable logic controls (PLCs), etc. In the following exemplary embodiments, a numerical control 20 is used representatively as control device 20. In particular, the measuring device is a position-measuring device 30, e.g., for measuring the angle of rotation of and/or the number of revolutions performed by a shaft S.

For the exchange of data with numerical control 20, device 10 includes a slave interface 12 which is connected by a first interface cable 13 to a master interface 22 of an interface controller 24 of numerical control 20. The device further includes a master interface 18 which is connected by a second interface cable 19 to a slave interface 32 of position-measuring device 30. The central unit of device 10 includes a circuit configuration 15, which processes interface signals. The design of circuit configuration 15 is described in greater detail below in connection with FIG. 2.

The interface cables and the interfaces are equipped in customary manner with suitable plug-in connectors, so that a device according to example embodiments of the present invention may also easily be inserted between numerical control 20 and position-measuring device 30 in the case of pre-installed automation systems or machine tools by, for example, breaking the connection between master interface 22 of numerical control 20 and slave interface 32 of position-measuring device 30, and providing a connection between master interface 22 of numerical control 20 with slave interface 12 of device 10, as well as between slave interface 32 of position-measuring device 30 and master interface 18 of device 10. For the sake of completeness, it should also be mentioned that power is usually supplied to position-measuring device 30 by the interface cable, as well, and a suitable connection is produced in device 10. This power supply may also be utilized for the operation of device 10.

Furthermore, in, e.g., a conventional manner, the interfaces may include driver and receiver modules in order, for example, to convert interface signals which are generated and processed as simple, single-ended, digital signals in numerical control 20, device 10, and position-measuring device 30, into signals which are suitable for interference-proof transmission over greater distances. Driver and receiver modules which allow differential transmission of digital signals according to the familiar RS-485 standard are especially widespread. The conversion of digital interface signals into optical signals which are transmitted via optical fibers is familiar and advantageous, as well.

Which data is requested from position-measuring device 30 or transmitted to position-measuring device 30 is determined in numerical control 20 by a control unit 26, which is connected via an application interface 27, 28 to interface controller 24. In this context, interface controller 24 is used as a translation unit which converts communication instructions from general application interface 27, 28 into interface signals of special master interface 22 of numerical control 20. The provision of requested data and the processing of received data, respectively, are carried out in position-measuring device 30 in a measuring unit 34.

Control unit 26 is a program-controlled unit, especially based on a microcontroller or microprocessor. Examples for functions of control unit 26 are the readout and display of position values, as well as the controlling of complex control loops, in that it requests actual values from measuring devices, e.g., position-measuring devices 30, and from these actual values, ascertains setpoint values for the control of drives.

According to example embodiments of the present invention, at least one sensor interface 300 is provided on device 10. Sensor interface 300 may be implemented as an analog interface for the connection of an analog sensor 310, or as a digital interface for the connection of a digital sensor 310.

If sensor interface 300 is an analog interface, then, in device 10, a sensor-data processing unit 320 is provided which converts the analog sensor signals, thus the measured value from sensor 310, into a digital sensor-data signal S_M. Suitable means, e.g., an analog-to-digital converter, is provided in sensor-data processing unit 320 for that purpose.

On the other hand, if sensor interface 300 is a digital interface, then digital sensor-data signal S_M, which includes the measured value from sensor 310, results directly from connected sensor 310. It may be that, in principle, sensor interface 300 may be of the same type as slave interface 12 or master interface 18. However, since they often have a higher complexity and data-transmission speed than is needed for transmitting sensor data, simpler serial interfaces may be used as sensor interface 300. A few examples for the implementation of sensor interface 300 would be the I2C-, SPI- or JTAG-interface. Moreover, wireless interfaces are also possible, for example, optical according to the IrDA standard or via radio link according to the Bluetooth or ZigBee standard. Sensor interface 300 may be implemented as an RFID (Radio-Frequency Identification) reader unit and the sensor as an RFID-tag, as well.

Digital sensor-data signal S_M is supplied to circuit configuration 15. In so doing, instantaneous sensor values may be transmitted unprompted and continuously, i.e., at short time intervals, via sensor-data signal S_M to circuit configuration 15, or else only upon prompting of circuit configuration 15. In the latter case, circuit configuration 15 assumes control of sensor interface 300.

On device 10, an operator interface 16 may also be provided, to which an operator-control unit 40 is connectable with the aid of a further interface cable 45. Operator interface 16 may be used both for programming and for controlling the functions of circuit configuration 15. Operator interface 16 is also not restricted to a specific interface variant. For example the same designs are possible which may be selected for sensor interface 300, as well.

In practice, it is especially advantageous if a conventional personal computer, especially a laptop or notebook computer, is used as operator-control unit 40. Such devices are usually provided with USB or Ethernet interfaces, which likewise are suitable as operator interface 16. Instead of a separate operator-control unit 40, it is also possible to operate device 10 via an additional interface of control device 20.

Optionally, operator-control elements, e.g., implemented as a keypad and a display unit in the form of a single-line or multi-line display via which circuit configuration 15 is programmable and/or operable, may also be provided in device 10. In this manner, complex operating functions, e.g., selection of sensor 310 connected to sensor interface 300, data format, interface protocol, etc., may be performed directly on device 10, so that the device is operable as an autonomous unit.

In the present example, master interface 22 of numerical control 20 includes an EnDat interface. Therefore, the physical data transmission, as described in European Patent No. 0 660 209 mentioned above, is carried out according to the RS-485 standard in the form of differential signals via two pairs of lines, the first pair of lines being used for the bidirectional transmission of data and the second pair of lines being used for the unidirectional transmission of a clock signal. The data is transmitted in synchronism with the clock signal. For this interface, three interface signals must be managed internally: a clock signal TCLK, a data-input signal DIN, and a data-output signal DOUT. The setting of the data direction, thus, whether the data-output signal is output actively, is accomplished via an enable signal OEN that is switched in accordance with the data-transmission protocol.

In the following, slave interface signals, which are used for the communication of slave interface 12 of device 10 with master interface 22 of numerical control 20, are denoted as slave-data input signal DIN_S, slave-data output signal DOUT_S, slave clock signal TCLK_S, and slave enable signal OEN_S. Analogously, master interface 18 of device 10 communicates with slave interface 32 of position-measuring device 30 via master interface signals, particularly via a master-data input signal DIN_M, a master-data output signal DOUT_M, a master clock signal TCLK_M, and a master enable signal OEN_M. Corresponding interface signals are, in each case, slave-data input signal DIN_S and master-data output signal DOUT_M, slave clock signal TCLK_S, and master clock signal TCLK_M, as well as master-data input signal DIN_M and slave-data output signal DOUT_S.

Figure 2:
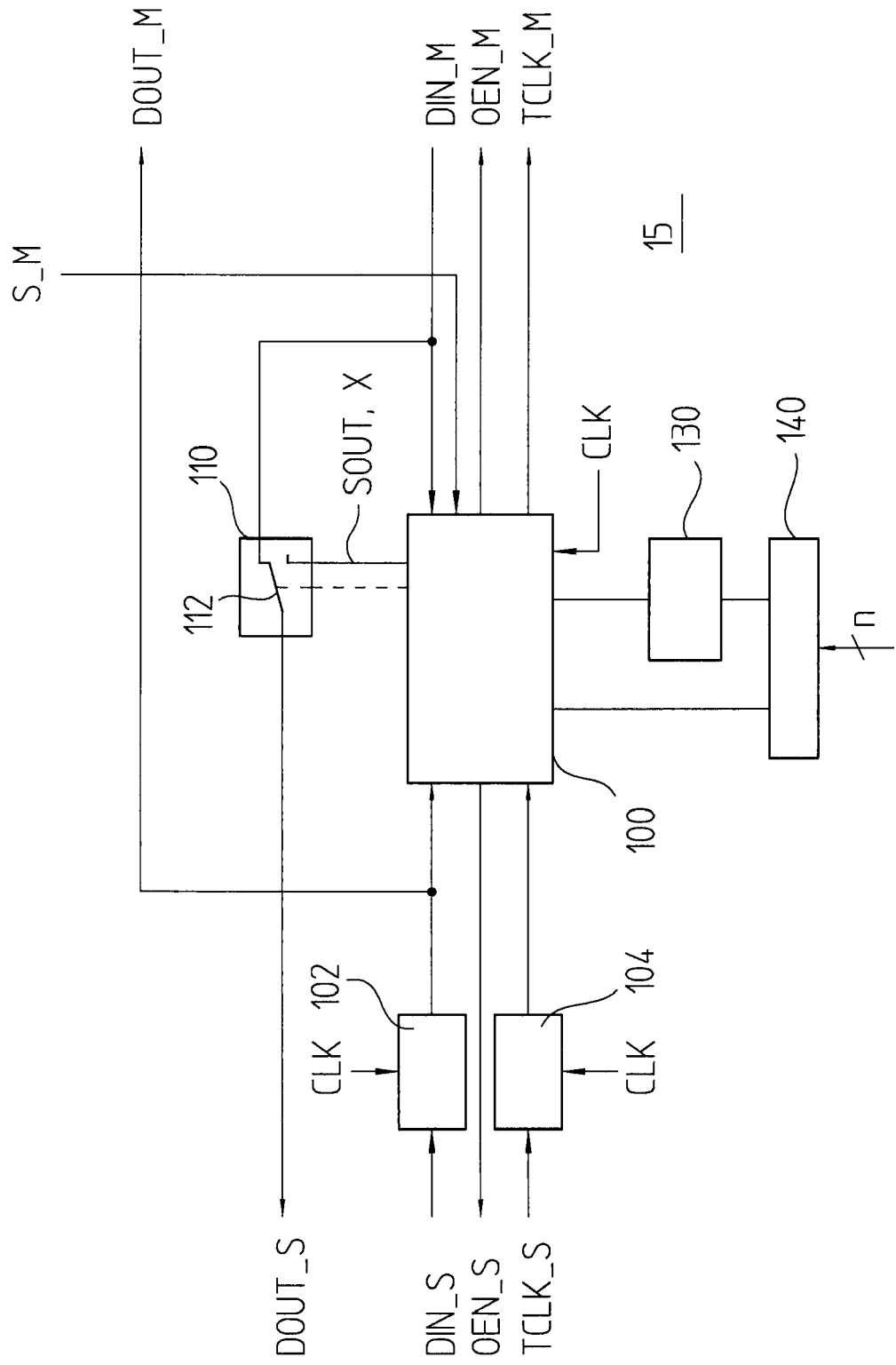
FIG. 2 is a block diagram that illustrates a circuit configuration which is contained in a device according to an example embodiment of the present invention.

FIG. 2 shows a block diagram of a circuit configuration 15. Protocol-relevant interface signals, e.g., signals which are suitable for detecting and processing the data-transmission protocol, are supplied to a central protocol unit 100. In the present example, slave-data input signal DIN_S (for the identification of commands which are sent by numerical control 20 to position-measuring device 30) and slave clock signal TCLK_S (with which the data transmission is synchronized) are protocol-relevant interface signals. Master-data input signal DIN_M may be protocol-relevant as well, for example, when the protocol sequence is a function of response data of position-measuring device 30, or of the instant certain response data is received. Depending on the instantaneous data direction, which is obtained from the protocol sequence, protocol unit 100 also generates slave enable signal OEN_S and master enable signal OEN_M. Moreover, protocol unit 100 also outputs master clock signal TCLK_M via master interface 18 to position-measuring device 30.

Additionally, sensor-data signal S_M is supplied to protocol unit 100. Any digital data-transmission method as desired is suitable for transmitting sensor-data signal S_M to protocol unit 100. For example, sensor-data signal S_M is transmitted in the form of a digital, serial data stream to protocol unit 100. As already mentioned above, instantaneous sensor values may arrive unprompted and continuously, i.e., at short time intervals, via sensor-data signal S_M, or the transmission of instantaneous sensor values may be initiated by protocol unit 100.

In addition to protocol unit 100, circuit configuration 15 includes a manipulation unit 110. Master-data input signal DIN_M is supplied to it at a first input, and a sensor-data output signal SOUT, generated in protocol unit 100 from sensor-data signal S_M, as well as possibly a correction-data signal X, are supplied to a second input. At its output, manipulation unit 110 outputs slave-data output signal DOUT_S in the direction of numerical control 20. A changeover switch 112 in manipulation unit 110 determines whether master-data input signal DIN_M or sensor-data output signal SOUT, or correction-data signal X is output as slave-data output signal DOUT_S. In other words, in place of the data arriving via master-data input signal DIN_M from position-measuring device 30, changeover switch 112 provides a possibility to output alternative data, particularly sensor-data output signal SOUT, to numerical control 20.

Changeover switch 112 is controlled by protocol unit 100.

Protocol unit 100 may be arranged as a state-controlled unit that recognizes information, especially commands, which arrive with the protocol-relevant interface signals from numerical control 20, and controls changeover switch 112 as a function of this information and according to predefined manipulation rules.

In addition, from sensor-data signal S_M, protocol unit 100 generates sensor-data output signal SOUT, so that it is inserted without gap into the data stream output as slave-data output signal DOUT_S. In the example described, in which the data arrives at manipulation unit 110 as master-data input signal DIN_M from position-measuring device 30 synchronized with master clock signal TCLK_M and is passed on as slave-data output signal DOUT_S in the direction of numerical control 20, this means that as sensor-data output signal SOUT, protocol unit 100 generates a data sequence which, for output, is likewise output in synchronism with master clock signal TCLK_M to manipulation unit 110. Moreover, the operations carried out for generating sensor-data output signal SOUT may include a conversion of the data format or an adjustment of the resolution of the sensor value contained in sensor-data signal S_M.

The output of sensor-data output signal SOUT may give rise to inconsistencies in slave-data output signal DOUT_S, which are interpreted as errors in numerical control 20. In order to rectify such inconsistencies, a correction-data signal X is further able to be generated in protocol unit 100, which, like sensor-data output signal SOUT, is able to be supplied to manipulation unit 110, and is able to be output as slave-data output signal DOUT_S to numerical control 20 in place of master-data input signal DIN_M. The point at which correction-data signal X is output in the data transmission is determined by protocol unit 100, again on the basis of protocol-relevant interface signals, for example, slave-data input signal DIN_S, slave clock signal TCLK_S, or master-data input signal DIN_M.

An example of this: To safeguard the data transmission, i.e., as a possibility for checking whether the data has arrived correctly at numerical control 20, frequently a checksum CRC (Cyclic Redundancy Check) is generated by the sender (position-measuring device 30), and is transmitted to numerical control 20, as well. If the data stream is manipulated and a portion of the transmitted data is replaced by sensor-data output signal SOUT, then checksum CRC no longer matches the transmitted data, and numerical control 20 would recognize an error in this inconsistency. In order to prevent this, in this case, from the data contained in master-data input signal DIN_M and from sensor-data output signal SOUT, protocol unit 100 generates a new checksum, which takes into account the altered data, and outputs it as correction-data signal X in place of the checksum transmitted by position-measuring device 30. Analogous to the output of sensor-data output signal SOUT, correction-data signal X is output in synchronism with master clock signal TCLK_M.

Protocol unit 100 operates in synchronism with a working clock-pulse signal CLK, which is either generated in circuit configuration 15, or is supplied to it from outside. Since the interface signals which arrive at circuit configuration 15 from the direction of numerical control 20—e.g., slave clock signal TCLK_S and slave-data input signal DIN_S in this example—are asynchronous with respect to working clock-pulse signal CLK, it is advantageous to already synchronize them with working clock-pulse signal CLK at the input of circuit configuration 15 with the aid of synchronization units 102, 104. In so doing, these signals are merely time-delayed, but otherwise remain largely unaltered. Since the response data of position-measuring device 30 thereby also arrives in delayed fashion at numerical control 20, such a delay affects numerical control 20 in the same manner as the use of longer interface cables 13, 19. In order to be able to process the interface signals, working clock-pulse signal CLK must have the same or a higher frequency than the maximum frequency to be expected of slave clock signal TCLK_S. In general, the higher the frequency of working clock-pulse signal CLK, the smaller the time delay of the interface signals. Given a maximum frequency of slave clock signal TCLK_S of 10 MHz, a frequency of working clock-pulse signal CLK in the range of 40 to 100 MHz may be provided.

The manipulation rules may be stored permanently in protocol unit 100, for example. However, it is especially advantageous to provide a manipulation memory 130 whose contents are programmable via a communication unit 140 that communicates with operator-control unit 40 via operator interface 16. In manipulation memory 130, it is possible to store which of the commands that numerical control 20 transmits to position-measuring device 30 are to be used in order to transmit sensor-data output signal SOUT in place of the data actually arriving from position-measuring device 30. In this manner, device 10 may be adapted flexibly to altered requirements.

A programmable component, e.g., a FPGA (Field Programmable Gate Array) may be used as circuit configuration 15. Such components are able to be reprogrammed at any time, and are therefore best-suited to react to changes and/or expansions of the manipulation possibilities of the device 10. Microcontrollers are likewise particularly well-suited as circuit configuration 15, since they are also easy to reprogram and to adapt to altered conditions. For example, circuit configuration 15 may be programmed via operator interface 16.

Figure 3:
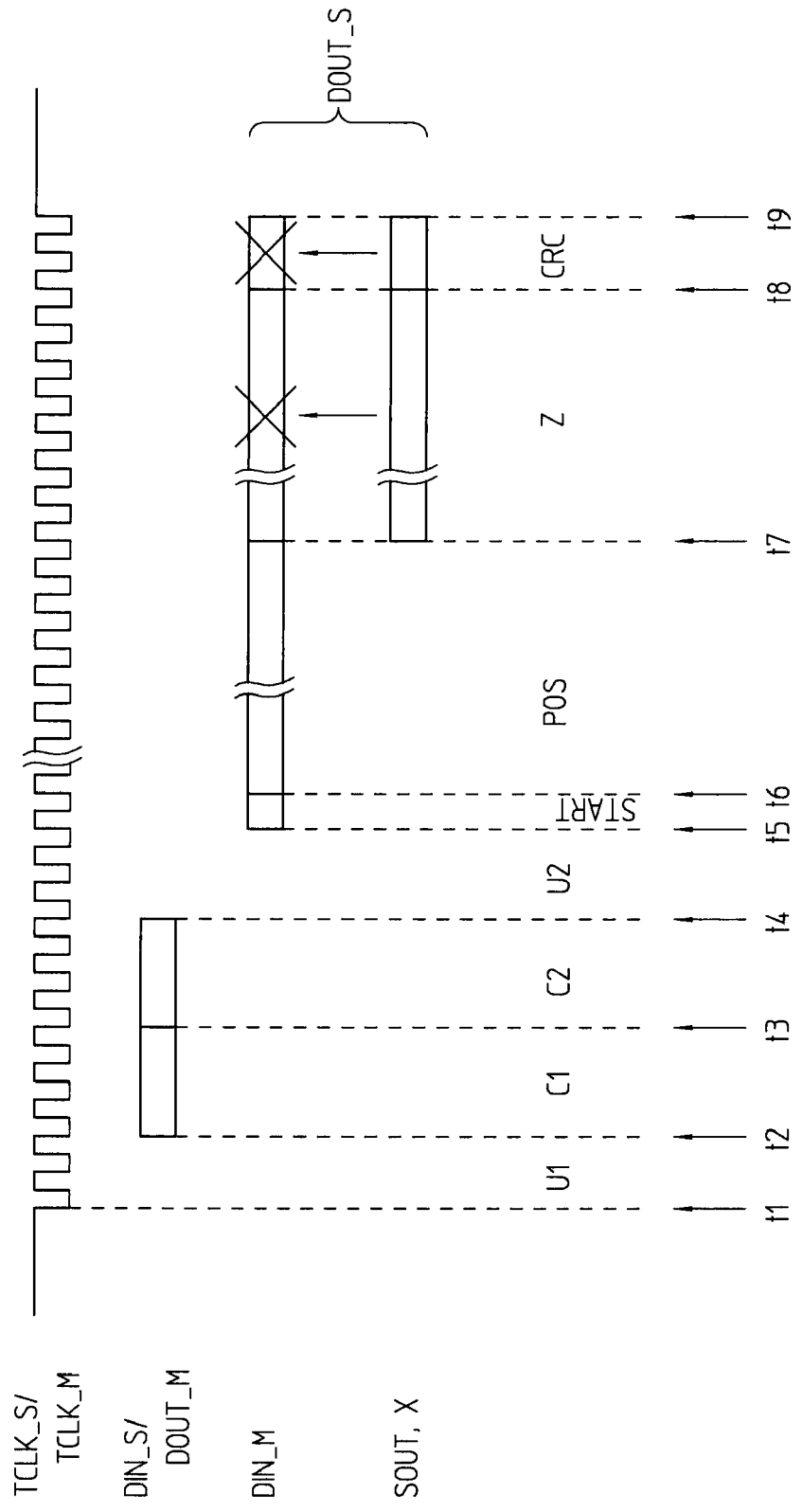
FIG. 3 illustrates a simplified data-transmission sequence to illustrate the functioning operation of a device according to an example embodiment of the present invention.

FIG. 3 shows a simplified data-transmission sequence to illustrate the operation of device 10. In particular, slight time delays, caused by the processing or synchronization of the interface signals in circuit configuration 15, are not shown. The transmission of a special position-request command from numerical control 20 to position-measuring device 30 is shown, whereupon position-measuring device 30 transmits instantaneous position data POS and supplementary data Z to numerical control 20. For example, the supplementary data may be data from a memory in position-measuring device 30. To increase transmission reliability, first of all, the position-request command is redundant. For example, it includes a first command block C1 and a second command block C2, including, for example, of 3 bits each, second command block C2 merely repeating first command block C1 identically or in inverted fashion. Secondly, position-measuring device 30 transmits a checksum CRC in conclusion.

As a manipulation rule for the position-request command described above, it is stored in device 10 that in place of supplementary data Z, a temperature value of a temperature sensor, which is connected as sensor 310 to sensor interface 300, is to be transmitted to numerical control 20. Thus, the manipulation rule determines at what instant manipulation unit 110 must be switched over in order, instead of master-data input signal DIN_M, to output sensor-data output signal SOUT as slave-data output signal DOUT_S, as well as a correspondingly altered checksum CRC.

It should be noted that manipulation rules do not necessarily have to be assigned to commands that are sent within the framework of the data-transmission protocol from numerical control 20 to position-measuring device 30. Rather, a manipulation rule may be assigned to any information at all which arrives at device 10 or circuit configuration 15 from numerical control 20, or from position-measuring device 30. In a simple case, the onset of the clock signal, thus, the beginning of a data transmission, may already be evaluated as information to which a manipulation rule is assigned.

The first line of the data-transmission sequence illustrated in FIG. 3 shows slave clock signal TCLK_S arriving at circuit configuration 15 from numerical control 20, and (disregarding a delay), master clock signal TCLK_M forwarded by circuit configuration 15 to position-measuring device 30.

The second line shows slave-data input signal DIN_S, which includes command blocks C1 and C2 and is forwarded—possibly after synchronization with working clock-pulse signal CLK in synchronization unit 102—as master-data output signal DOUT_M in the direction of position-measuring device 30.

In the third line, master-data input signal DIN_M is illustrated, which contains the response data from position-measuring device 30.

Finally, the fourth line shows sensor-data output signal SOUT and a correction-data signal X which are generated by protocol unit 100, the first from sensor-data signal S_M, the latter from the entire data stream transmitted to numerical control 20.

The time sequence is as follows: After the activation of slave clock signal TCLK_S, initially the data direction is switched over. Assuming that in the quiescent state, slave enable signal OEN_S is switched to active and master enable signal OEN_M is switched to passive, in a first switchover time U1 between points in time t1 and t2, protocol unit 100 first switches slave enable signal OEN_S to passive and then switches master enable signal OEN_M to active. The switchover is performed in time-stacked fashion in order to avoid data collisions.

As of point in time t2, first command block C1 is transmitted, followed, as of point in time t3, by second command block C2.

The transmission of second command block C2 is ended at point in time t4. By comparing command blocks C1, C2, protocol unit 100 is able to determine whether the transmission of the command was error-free. At point in time t4 at the latest, protocol unit 100 has sufficient information to be able to determine whether interface signals should be manipulated, that is, whether, as in this example, a manipulation rule exists for this command. For example, the manipulation rule is defined in protocol unit 100 or stored in manipulation memory 130.

The transmission of the command is followed by a second switchover time U2 from point in time t4 to point in time t5, in which the data direction is switched over. For example, the protocol unit switches master enable signal OEN_M to passive and slave enable signal OEN_S to active.

As of point in time t5, the transmission of the response data from position-measuring device 30 to numerical control 20 begins, in the course of which, first a start sequence START is transmitted, which, for example, includes a start bit, followed by several status bits that allow conclusions about the operating state of position-measuring device 30.

Following start sequence START, position value POS is transmitted as of point in time t6.

Conforming to the manipulation rule for the present command, at point in time t7, protocol unit 100 switches over switching element 112 in manipulation unit 110, so that as of this point in time, sensor-data output signal SOUT, which is generated by protocol unit 100 from sensor-data signal S_M, is output as slave-data output signal DOUT_S to numerical control 20 in place of master-data input signal DIN_M.

The transmission of checksum CRC follows immediately as of point in time t8, switching element 112 remains in the switched-over position, and protocol unit 100 outputs checksum CRC as correction-data signal X, adapted to the altered data.

At point in time t9, the data transmission is ended, and protocol unit 100 as well as manipulation unit 112 return to the initial state.

As the example for manipulation of data traffic between master interface 22 of a numerical control 20 and the slave interface of a position-measuring device 30, described in connection with FIG. 3, shows, a device 10 or a circuit configuration 15 provides a simple and effective possibility for inserting measuring data of a sensor 310 into an existing interface communication. It is especially advantageous that neither numerical control 20 nor position-measuring device 30 needs to be modified for this.

What is claimed is:

1. A device for transmitting sensor data, comprising:
   a first slave interface connectable to a master interface of a control device;
   a first master interface connectable to a slave interface of a measuring device;
   at least one sensor interface connectable to a sensor; and
   a circuit configuration including a manipulation unit and a protocol unit;
   wherein the manipulation unit is adapted to receive a master-data input signal of the first master interface and a sensor-data output signal and to output a slave-data output signal to the first slave interface;
   wherein the protocol unit is adapted to receive (a) at least one protocol-relevant interface signal of the first slave interface or of the first master interface and (b) a sensor-data signal of the sensor interface;
   wherein the protocol unit is adapted to generate the sensor-data output signal from the sensor-data signal; and
   wherein the protocol unit is adapted to select, based on manipulation rules and the at least one protocol-relevant interface signal, when the manipulation unit outputs the master-data input signal of the first master interface or the sensor-data output signal as the slave-data output signal.

2. The device according to claim 1, wherein the sensor includes a digital sensor.

3. The device according to claim 1, wherein the sensor includes an analog sensor, the device further comprising a sensor-data processing unit adapted to generate the sensor-data signal from a sensor signal of the analog sensor.

4. The device according to claim 1, wherein, to rectify inconsistencies in the slave-data output signal caused by an output of the sensor-data output signal, the protocol unit is adapted to generate a correction-data signal, the manipulation unit is adapted to receive the correction-data signal, and the manipulation unit is adapted to output the correction-data signal as the salve-data output signal as a function of the protocol-relevant interface signal.

5. The device according to claim 1, further comprising an operator interface connectable to an operator-control unit, the operator interface adapted to program and/or operate the circuit configuration.

6. The device according to claim 1, wherein the circuit configuration includes a manipulation memory adapted to store manipulation rules.

7. The device according to claim 6, further comprising an operator interface connectable to an operator-control unit, the operator interface adapted to program and/or operate the circuit configuration, the manipulation memory writable via the operator interface.

8. A system, comprising:
   a control device including a first master interface;
   a measuring device including a first slave interface;
   a sensor; and
   a device adapted to transmit sensor data, including:
      a second slave interface connected to the master interface of the control device;
      a second master interface connected to the slave interface of the measuring device;
      at least one sensor interface connected to the sensor; and
      a circuit configuration including a manipulation unit and a protocol unit;
   wherein the manipulation unit is adapted to receive a master-data input signal of the second master interface and a sensor-data output signal and to output a slave-data output signal to the second slave interface;
   wherein the protocol unit is adapted to receive (a) at least one protocol-relevant interface signal of the second slave interface or of the second master interface and (b) a sensor-data signal of the sensor interface;
   wherein the protocol unit is adapted to generate the sensor-data output signal from the sensor-data signal; and
   wherein the protocol unit is adapted to select, based on manipulation rules and the at least one protocol-relevant interface signal, when the manipulation unit outputs the master-data input signal of the second master interface or the sensor-data output signal as the slave-data output signal.

\* \* \* \* \*